US00RE42987E

(19) United States
(12) Reissued Patent
Akiba

(10) Patent Number: US RE42,987 E
(45) Date of Reissued Patent: Dec. 6, 2011

(54) NAIL GUN WITH SAFETY PORTION MECHANISM FOR PREVENTING MISFIRES

(75) Inventor: Yoshitaka Akiba, Tokyo (JP)

(73) Assignee: Hitachi Koki Co., Ltd., Tokyo (JP)

(21) Appl. No.: 12/201,413

(22) Filed: Aug. 29, 2008

Related U.S. Patent Documents

Reissue of:
(64) Patent No.: 6,820,788
Issued: Nov. 23, 2004
Appl. No.: 10/659,438
Filed: Sep. 11, 2003

U.S. Applications:
(63) Continuation of application No. 10/119,721, filed on Apr. 11, 2002, now Pat. No. 6,641,018, which is a continuation of application No. 09/861,546, filed on May 22, 2001, now Pat. No. 6,394,332.

(30) Foreign Application Priority Data

May 23, 2000 (JP) ..... 2000-151263

(51) Int. Cl.
*B25C 1/04* (2006.01)
(52) U.S. Cl. ..... 227/8; 227/130
(58) Field of Classification Search ..... 227/8, 120, 227/130, 142
See application file for complete search history.

(56) References Cited

U.S. PATENT DOCUMENTS 4,629,106 A * 12/1986 Howard et al. ..... 227/8
5,193,730 A * 3/1993 Tanaka et al. ..... 227/8
5,238,167 A * 8/1993 Howard et al. ..... 227/110
5,452,835 A * 9/1995 Shkolnikov ..... 227/8
5,551,621 A * 9/1996 Vallee ..... 227/8
5,579,975 A * 12/1996 Moorman ..... 227/8
5,662,257 A * 9/1997 Mukoyama et al. ..... 227/8
5,692,663 A * 12/1997 Yang ..... 227/8
5,803,338 A * 9/1998 Singer et al. ..... 227/8

(Continued)

FOREIGN PATENT DOCUMENTS

DE 37 03 753 A1 8/1988

(Continued)

*Primary Examiner* — Scott A. Smith
(74) *Attorney, Agent, or Firm* — McDermott Will & Emery LLP

(57) ABSTRACT

A nail gun has a free end 19a and central potion of a trigger arm 19 positioned within a trigger 11, on an upper end 12a of a safety portion 12 and at a plunger 17, respectively. When the trigger 11 is pivoted on its pivot end 16, pivoting movement of the trigger 11 moves a pivot end 18 of the trigger arm 19 to press the central portion of the trigger arm 19 into contact with the plunger 17 and, with the plunger 17 serving as a fulcrum, to press the free end 19a downward against the upper end 12a of the safety portion 12. If downward movement of the safety portion 12 is obstructed when the trigger 11 is pivoted, the upper end 12a contacted by the free end 19a of the trigger arm 19 serves as a fulcrum around which the trigger arm 19 pivots with movement of the trigger 11, whereupon the central portion of the trigger arm 19 presses the plunger 17 inward so that an activation switch 10 activates a blade 7 to eject a nail through a nose piece 5.

22 Claims, 11 Drawing Sheets

U.S. PATENT DOCUMENTS

| | | | | | |
|---|---|---|---|---|---|
| 5,836,501 | A | * | 11/1998 | Lai | 227/8 |
| 5,862,969 | A | * | 1/1999 | Lee | 227/8 |
| 6,059,161 | A | * | 5/2000 | Chang et al. | 227/8 |
| 6,116,488 | A | * | 9/2000 | Lee | 227/8 |
| 6,199,739 | B1 | * | 3/2001 | Mukoyama et al. | 227/8 |
| 6,205,894 | B1 | * | 3/2001 | Tanaka | 81/470 |
| 6,371,348 | B1 | * | 4/2002 | Canlas et al. | 227/8 |
| 6,394,332 | B2 | * | 5/2002 | Akiba | 227/8 |
| 6,422,446 | B1 | * | 7/2002 | Liu | 227/8 |
| 6,641,018 | B2 | * | 11/2003 | Akiba | 227/8 |
| 6,820,788 | B2 | * | 11/2004 | Akiba | 227/8 |

FOREIGN PATENT DOCUMENTS

| | | | | |
|---|---|---|---|---|
| DE | 3703753 | | * | 8/1988 |
| DE | 30 21 884 | C2 | | 7/1989 |
| DE | 3021884 | | * | 7/1989 |
| DE | 40 32 231 | C2 | | 9/1992 |
| DE | 4032231 | | * | 9/1992 |
| JP | 6-47667 | Y | | 1/1992 |
| JP | 4-136677 | U | | 12/1992 |
| JP | 7-27093 | Y | | 12/1992 |
| JP | 5-53873 | U | | 7/1993 |
| JP | 6-47665 | | * | 12/1994 |
| JP | 6-47665 | Y2 | | 12/1994 |
| JP | 7-27093 | Y2 | | 6/1995 |
| JP | 7-53907 | | * | 12/1995 |
| JP | 7-53907 | Y2 | | 12/1995 |
| WO | WO 00/16947 | A1 | | 3/2000 |

* cited by examiner

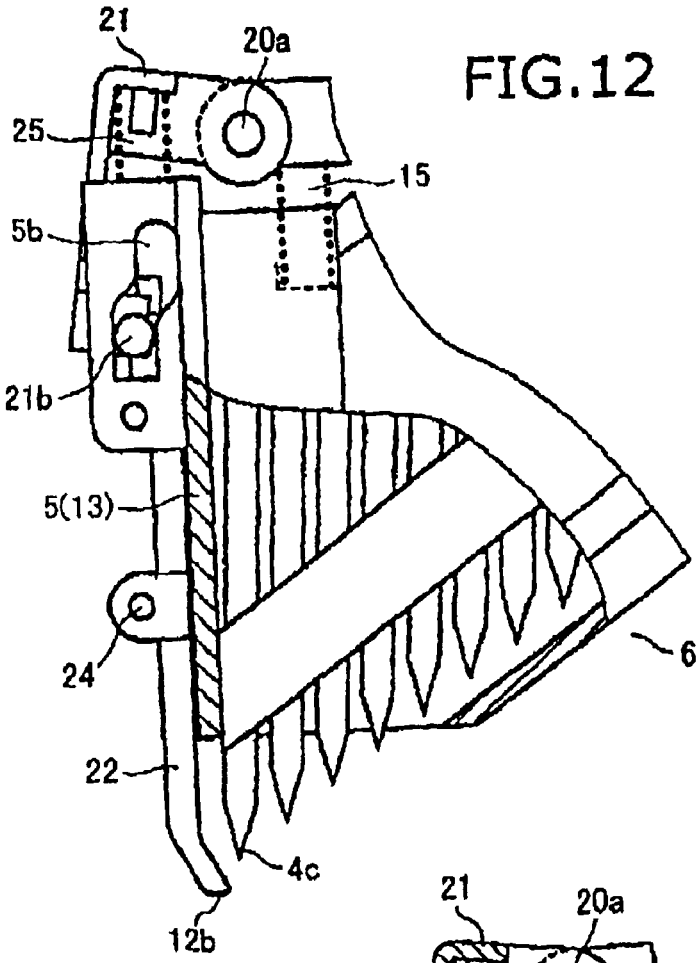
FIG.12
FIG.13
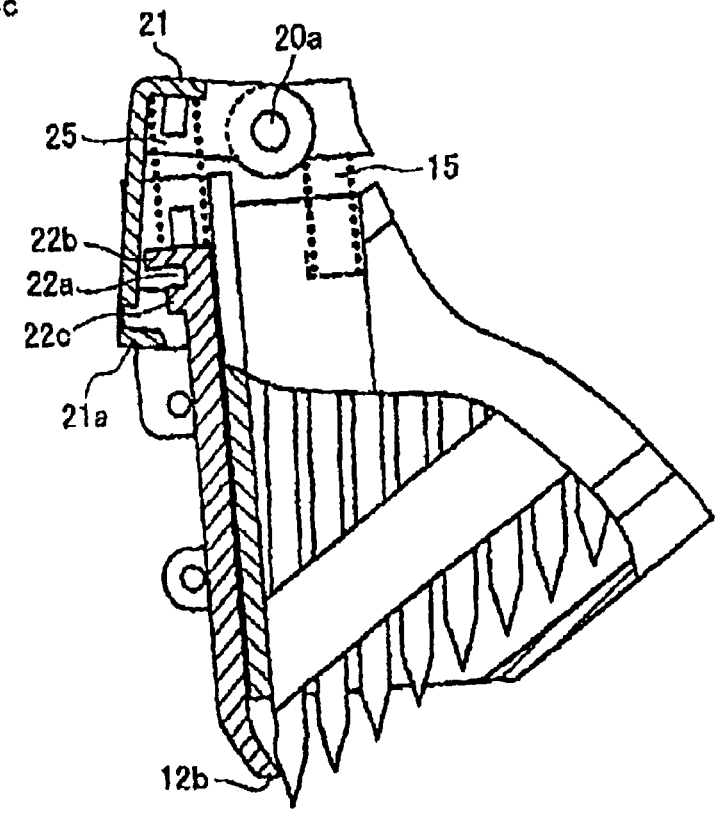

NAIL GUN WITH SAFETY PORTION MECHANISM FOR PREVENTING MISFIRES

Matter enclosed in heavy brackets [ ] appears in the original patent but forms no part of this reissue specification; matter printed in italics indicates the additions made by reissue.

This *is a reissue of U.S. Pat. No. 6,820,788, which* is a continuation of application Ser. No. 10/119,721 filed Apr. 11, 2002 now U.S. Pat. No. 6,641,018 which is a continuation of application Ser. No. 09/861,546 filed May 22, 2001; now U.S. Pat. No. 6,394,332; the disclosure of which is incorporated herein by reference.

BACKGROUND OF THE INVENTION

1. Field of the Invention

The present invention relates to a nail gun that drives a nail through, for example, the hole of a connection clasp and to a nail gun that can accurately drive nails into a desired drive position.

2. Description of the Related Art

A variety of different types of clasp fixing nail guns have been proposed. U.S. Pat. No. 5,193,730 discloses a nail gun that separates nails one at a time from a nail band and supplies the nail to a nail injection hole of the nosepiece. The nail tip is protruded from the end of the nosepiece before the nail gun drives the nail.

The nail gun further has a safety mechanism with a work-piece contact member, an intermediate lever, and an operation lever. The work-piece contact member extends from the nose of the nail gun to the base of the intermediate lever. When the trigger of the nail gun is pressed, the operation lever moves toward or away from an activation plunger, depending on the position of the work-piece contact member and the intermediate lever. That is, the work-piece contact member is raised into its lowermost position as long as the nose of the nail gun is not pressed against a work piece. If the trigger is pressed at this time, the intermediate lever pivots greatly and guides movement of the operation lever away from the activation plunger. On the other hand, when the nose of the nail gun is pressed against a work piece, the contact member is raised into its upper position. If the trigger is pulled at this time, pivoting movement of the intermediate lever is restricted so that the operation lever moves into contact with the activation plunger, thereby setting off a nail driving operation. In other words, the safety mechanism prevents the nail gun from firing when no work piece is present by changing the pivot path of the operation lever.

SUMMARY OF THE PRESENT INVENTION

It is conceivable to lengthen the stroke of the work-piece contact member, that is, the distance that the work-piece contact member can move, by increasing the length of the intermediate lever. However, the intermediate lever can only be lengthened within the movement range of the trigger. Therefore, it is difficult to lengthen the stroke of the work-piece contact member. As a result, the lower end of the work-piece contact member must always be positioned fairly near the nail ejection opening, even when the work-piece contact member is at its upper dead center. This makes it difficult to see the nail tip so that it is difficult to position the nail at the precise position where it is to be driven into the work piece.

Also, the intermediate lever and the operation lever are provided in a narrow space above the trigger and operate in a fairly complicated manner against urging force of springs. A slight error in component or position dimensions, abrasion caused by friction, or dust, dirt, and the like clinging to components could easily become the cause of misfires. As a result, reliability of the nail gun suffers.

It is an objective of the present invention to overcome the above-described problems and provide a nail gun that more easily allows visual confirmation of the nail tip location and that uses a simpler configuration, which improves reliability by helping prevent the danger of misfires.

In order to achieve the above-described objective, a nail gun according to the present invention includes a body; a nail ejection portion connected to the body and having a tip formed with a nail ejection hole; a magazine connected to the nail ejection portion, the magazine feeding nails one at a time to the ejection portion; a blade supported in the body capable of reciprocal movement in opposing first and second directions and, when activated, driven in the second direction to the nail ejection portion to strike a nail in the nail ejection portion and to eject the nail through the nail ejection hole; an activation switch having a protruding plunger, the activating switch activating the blade when the plunger is pressed inward; a trigger having a trigger pivot end and a trigger free end, the trigger being supported pivotably on the body at the trigger pivot end; a trigger arm positioned within the trigger, the trigger arm having a trigger-arm pivot end, a central portion, and a trigger-arm free end, the trigger-arm pivot end being pivotably disposed at a position between the plunger and the trigger free end, the central portion being disposed at a position adjacent to the plunger; a safety portion having a first-side end disposed in contact with the trigger-arm free end and a second-side end positioned near the nail ejection hole, the safety portion being supported capable of reciprocal movement in the first and second directions between an upper dead center and a lower dead center; and urging means for urging the safety portion into the upper dead center; wherein when the trigger is pivoted on the trigger pivot end, pivoting movement of the trigger moves the trigger-arm pivot end to press the central portion of the trigger arm into contact with the plunger and, with the plunger serving as a fulcrum, to press the trigger-arm free end in the second direction against the first-side end of the safety portion.

With this configuration, a long stroke can be achieved for the safety portion. Therefore, the lower end of the safety portion can be separated from the nail tip in the initial condition, so that whether the nail tip is properly set in the clasp hole can be visually confirmed with ease. That is, the position where nails will be driven into the work piece can be accurately set.

Also, only the trigger arm is provided within the trigger and the safety portion is configured from only the upper safety portion and the lower safety portion. Operations are more reliable because the configuration is so simple.

If movement of the safety portion in the second direction is obstructed when the trigger is pivoted on the trigger pivot end, then the first-side end of the safety portion contacted by the trigger-arm free end serves as a fulcrum around which the trigger arm pivots with movement of the trigger, whereupon the central portion presses the plunger inward so that the activation switch activates the blade.

As a result, a nail driving operation can be reliably performed.

BRIEF DESCRIPTION OF THE DRAWINGS

The above and other objects, features and advantages of the invention will become more apparent from reading the following description of the embodiments taken in connection with the accompanying drawings in which:

FIG. 12 is a cross-sectional view showing the cam member pivoted by downward movement of the safety portion in the situation shown in FIG. 11;

FIG. 13 is a cross-sectional view showing a lower portion of the safety portion moving upward when pressed against a work piece while the cam member is pivoted as shown in FIG. 12;

DETAILED DESCRIPTION OF THE EMBODIMENTS

Next, a nail gun according to a first embodiment of the present invention will be provided while referring to FIGS. 1 to 13. To facilitate explanation, the directional terms up, down, front, and rear will be used referring to orientation in which the nail gun is intended to be used and as indicated in FIG. 1.

Figure 1:
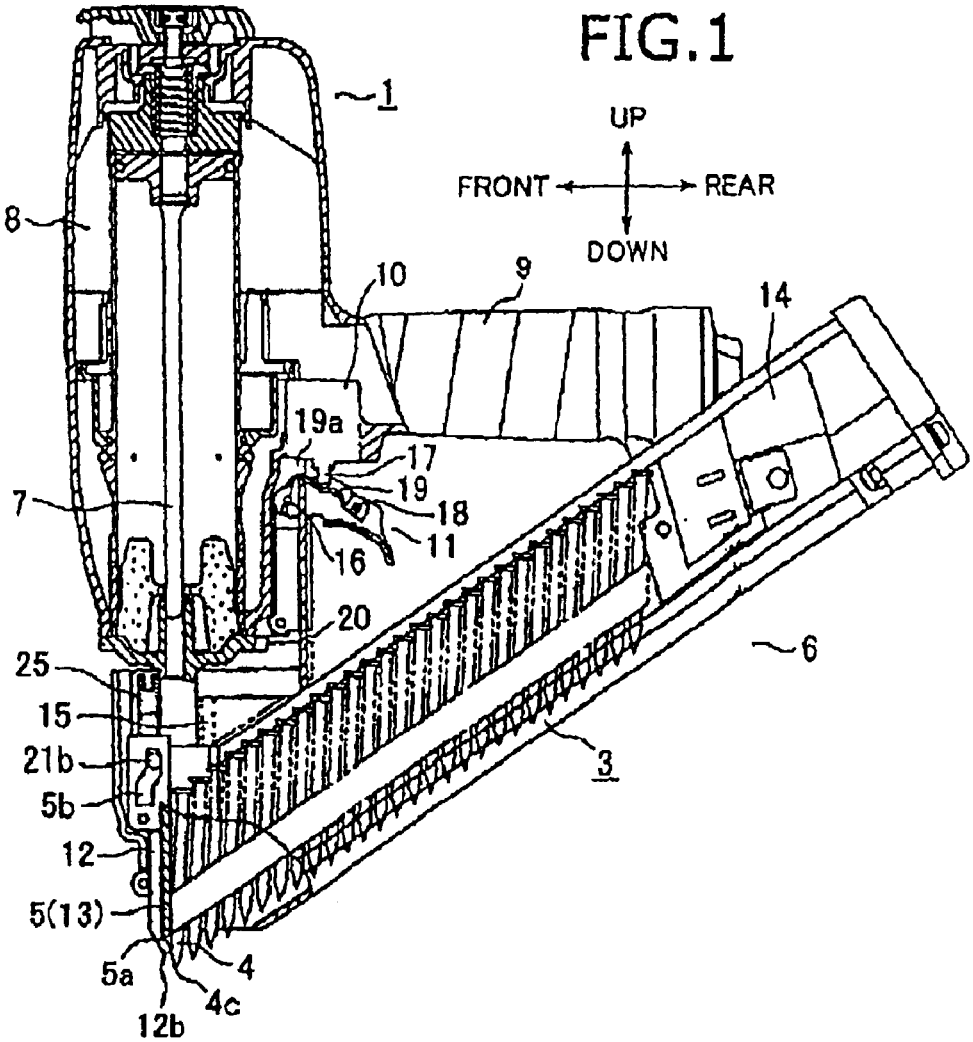
FIG. 1 is a cross-sectional side view showing a nail gun according to a first embodiment of the present invention.
Figure 2:
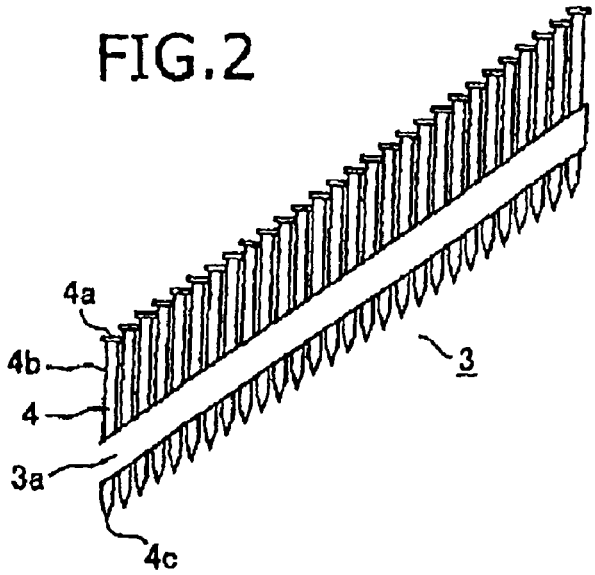
FIG. 2 is a side view showing connected nails used in the nail gun of FIG. 1.

As shown in FIG. 1, a nail gun 1 includes a nail ejection portion 5, a magazine 6, a drive portion 8, a trigger 11, and a safety portion 12. The magazine 6 houses connected nails 3 that are supplied to the nail ejection portion 5. As shown in FIG. 2, the connected nails 3 are arranged on a single plane, separated by a fixed distance, and connected by a connection band 3a. Each nail 4 typically has a circular head 4a at its upper end, a cylindrical body 4b, and an acutely pointed tip 4c. As shown in FIG. 1, the magazine 6 includes a feeder 14 and a feeder spring (not shown). The feeder 14 receives pressure from the feeder spring and feeds the nails 4 to the nail ejection portion 5, which is formed by a nosepiece 13 of the nail gun 1.

The nail ejection portion 5 is formed at its lower end with a nail ejection hole 5a. The tip 4c of the lead nail 4 within the nail ejection portion 5 protrudes downward out of the nail ejection hole 5a, so that the position of the nail tip 4c can be visually confirmed with ease.

The drive portion 8 houses a blade 7. The blade 7 is capable of reciprocal movement in the drive portion 8 to drive nails supplied to the nail ejection portion 5 out from the ejection hole 5a.

Figure 3:
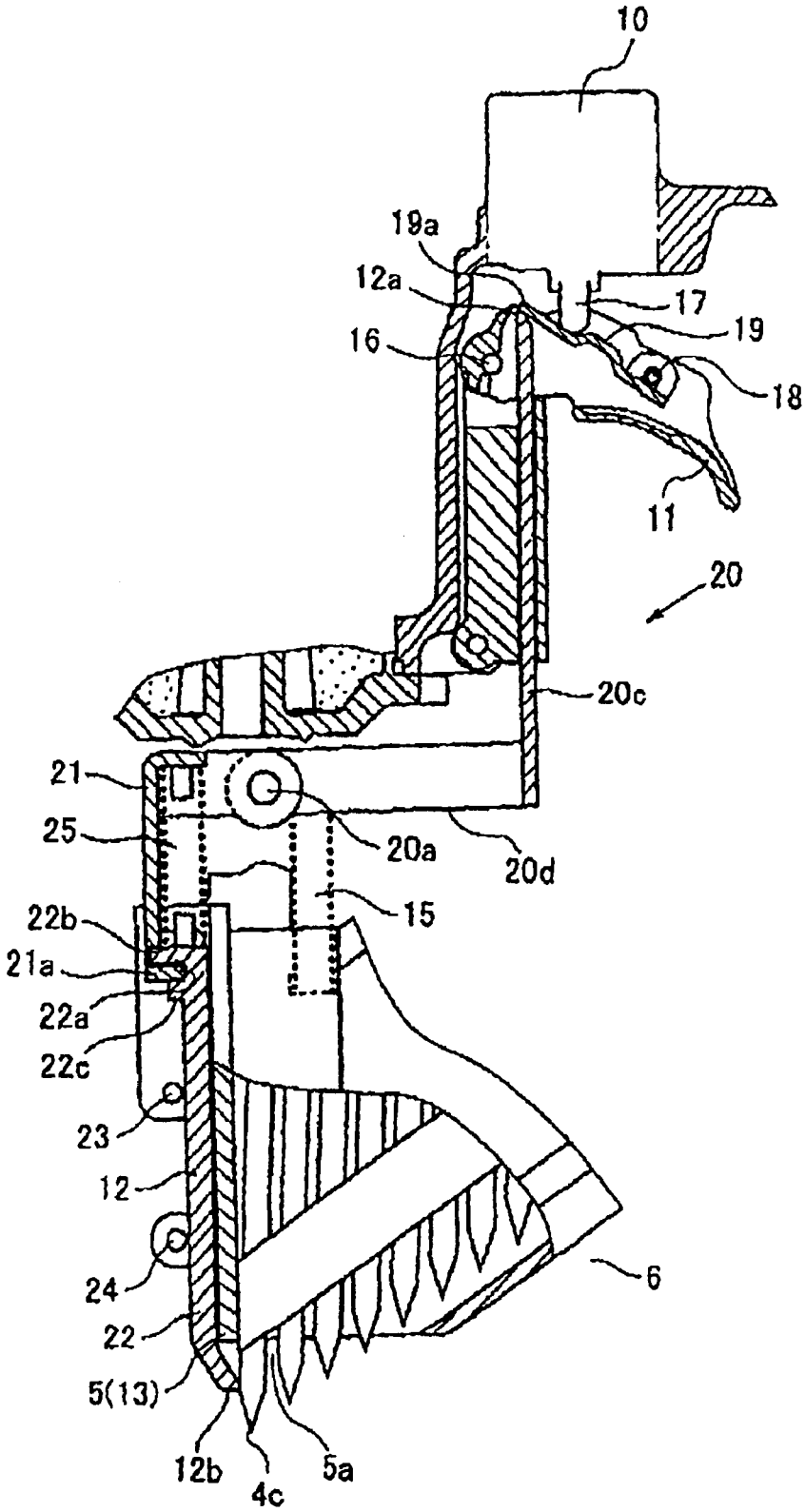
FIG. 3 is a cross-sectional view showing details of a safety portion and surrounding components of the nail gun in FIG. 1, while the trigger is not pulled.

The nail gun 1 also includes a handle 9 and an activation switch 10. The handle 9 is held by the user to support the nail gun 1. The activation switch 10 is for controlling a nail driving operation of the nail gun 1. As shown in FIG. 3, the activation switch 10 includes a downward-protruding plunger 17 substantially at its center. The plunger 17 is supported capable of reciprocal movement in the vertical direction. While the plunger 17 is positioned at its lower dead center, the activation switch 10 is maintained OFF, so the nail gun 1 remains in a non-activated condition. However, as the plunger 17 moves from its lower dead center to its upper dead center, the activation switch 10 is turned ON, so that the nail gun 1 starts a nail driving operation.

As shown in FIG. 3, the trigger 11 is supported adjacent to the activation switch 10 on a pivot shaft 16 so as to be capable of pivotable movement centered on the pivot shaft 16. The user uses a finger of the hand he or she uses to hold the handle 9 to pull the trigger 11. The trigger 11 is provided with a support portion 18 that pivotably supports a trigger arm 19. The trigger arm 19 is supported in a posture with the central portion in contact with the tip of the plunger 17 and with the other end 19a in contact on an upper end 12a of the safety portion 12.

The safety portion 12 is supported capable of reciprocal movement, in parallel with the reciprocal movement direction of the blade 7, between upper and lower dead centers as guided by a nose 13, which configures the nail ejection portion 5. The safety portion 12 is configured from an upper safety portion 20, a cam member 21, and a lower safety portion 22.

The upper safety portion 20 has a substantial reversed L-shape, and includes the upper end 12a, a vertical section 20c, and a horizontal section 20d. The upper end 12a is disposed in contact with the underside of the free end 19aof the trigger arm 19. A spring 15 is disposed beneath the horizontal section 20d for constantly urging the safety portion 12 toward its upper dead center.

Figure 11:
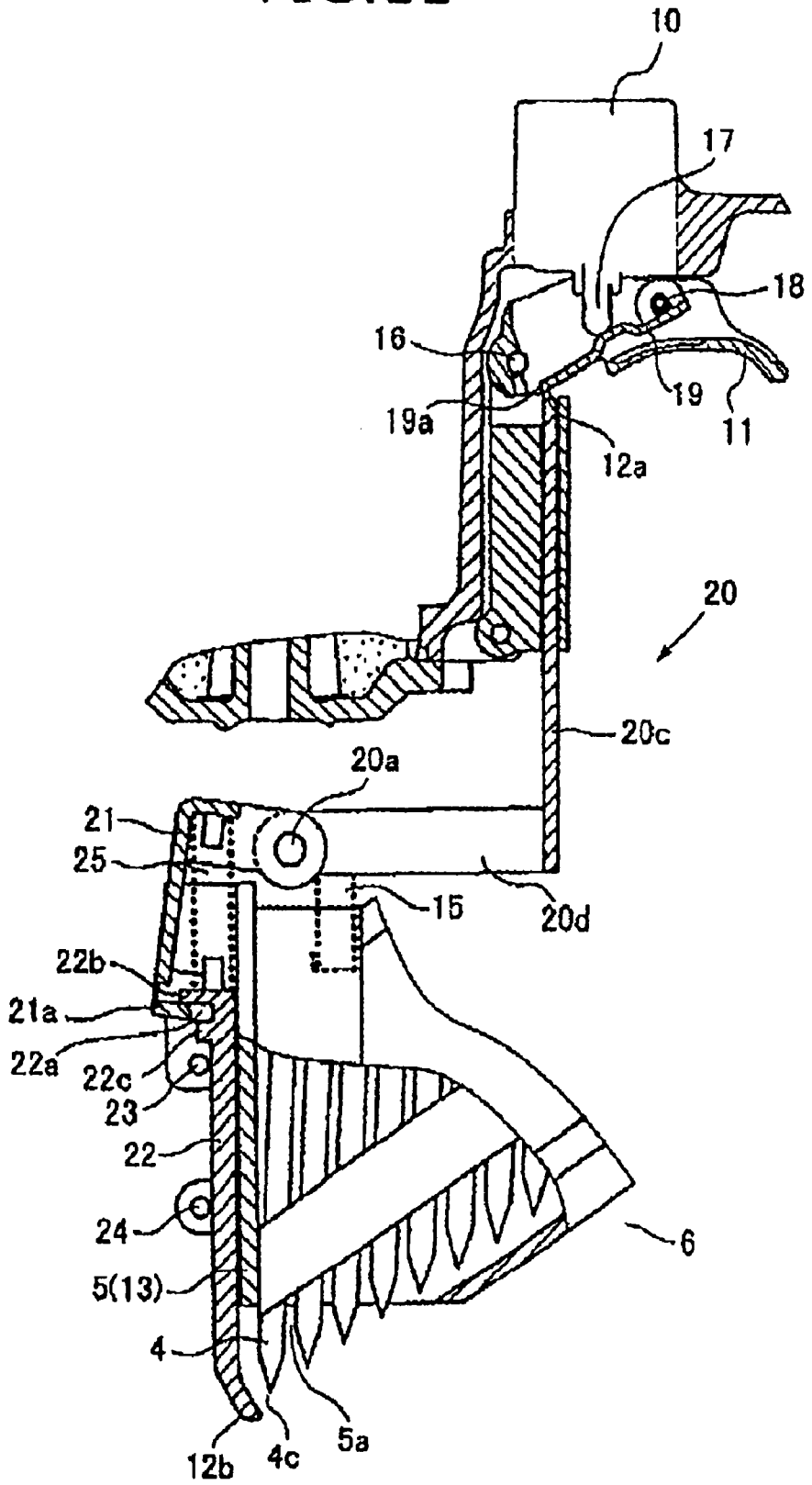
FIG. 11 is a cross-sectional view showing the trigger of the nail gun pulled while no work piece obstructs downward movement of the safety portion.

The lower safety portion 22 is supported capable of reciprocal movement in parallel with the reciprocal movement direction of the blade 7, as guided by pins 23, 24 provided in the nose 13. The lower safety portion 22 includes a lower end 12b and an engagement recess portion 22a. The lower end 12b is located near the ejection opening 5a of the nail ejection portion 5. When the safety portion 12 is in its upper dead center following the urging of the spring 15, the lower end 12b is retracted above the nail tip 4c as shown in FIG. 3. On the other hand, when the safety portion 12 is in its lower dead center, the lower end 12b protrudes beyond the nail tip 4c of the nail 4 in the nail ejection portion 5 as shown in FIG. 11. The engagement recess portion 22a is provided in the upper portion of the lower safety portion 22 and includes an upper plate 22b and a lower plate 22c, wherein the upper plate 22b protrudes further than the lower plate 22c. A spring 25 is provided for constantly urging the lower safety portion 22 downward when the nail gun 1 is oriented as in the drawings. Said differently, when the nail gun 1 is oriented for driving a nail upward, for example, into a ceiling fixture, the spring 25 prevents the lower safety portion 22 from sagging downward.

Figure 4:
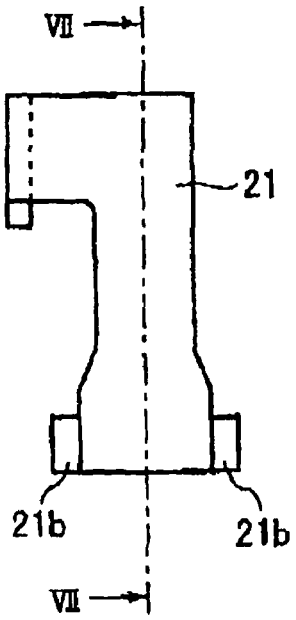
FIG. 4 is front view showing a cam member of the safety portion.
Figure 5:
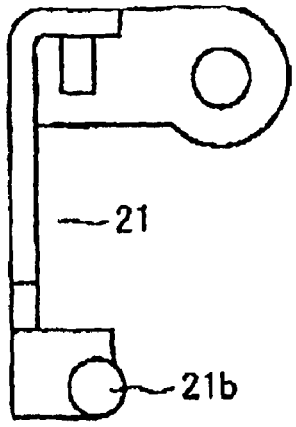
FIG. 5 is a side view of the cam member of FIG. 4.
Figure 6:
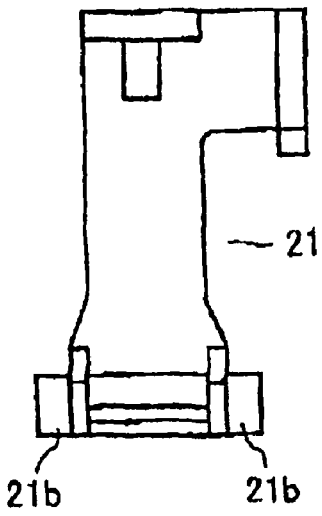
FIG. 6 is a back view of the cam member of FIG. 4.
Figure 7:
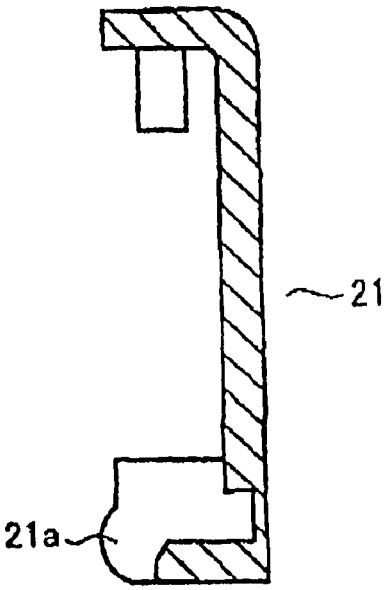
FIG. 7 is a cross-sectional view taken along line VII-VII of FIG. 4.
Figure 8:
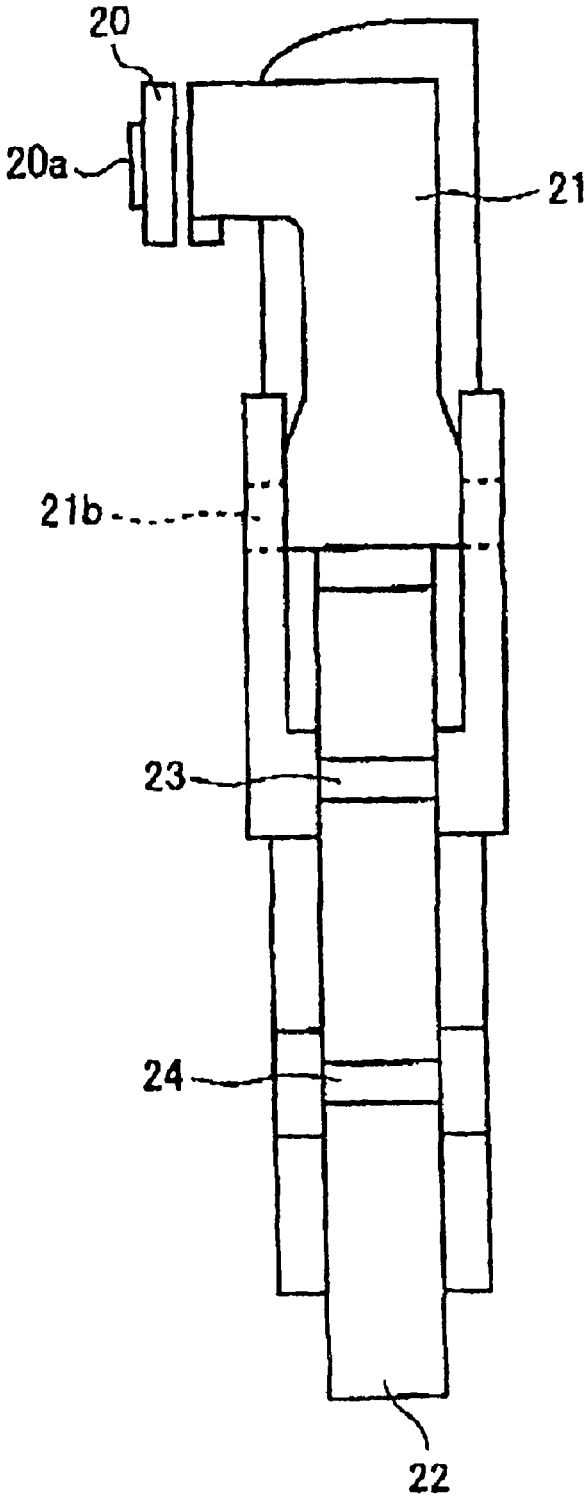
FIG. 8 is a front view of the safety portion.
Figure 9:
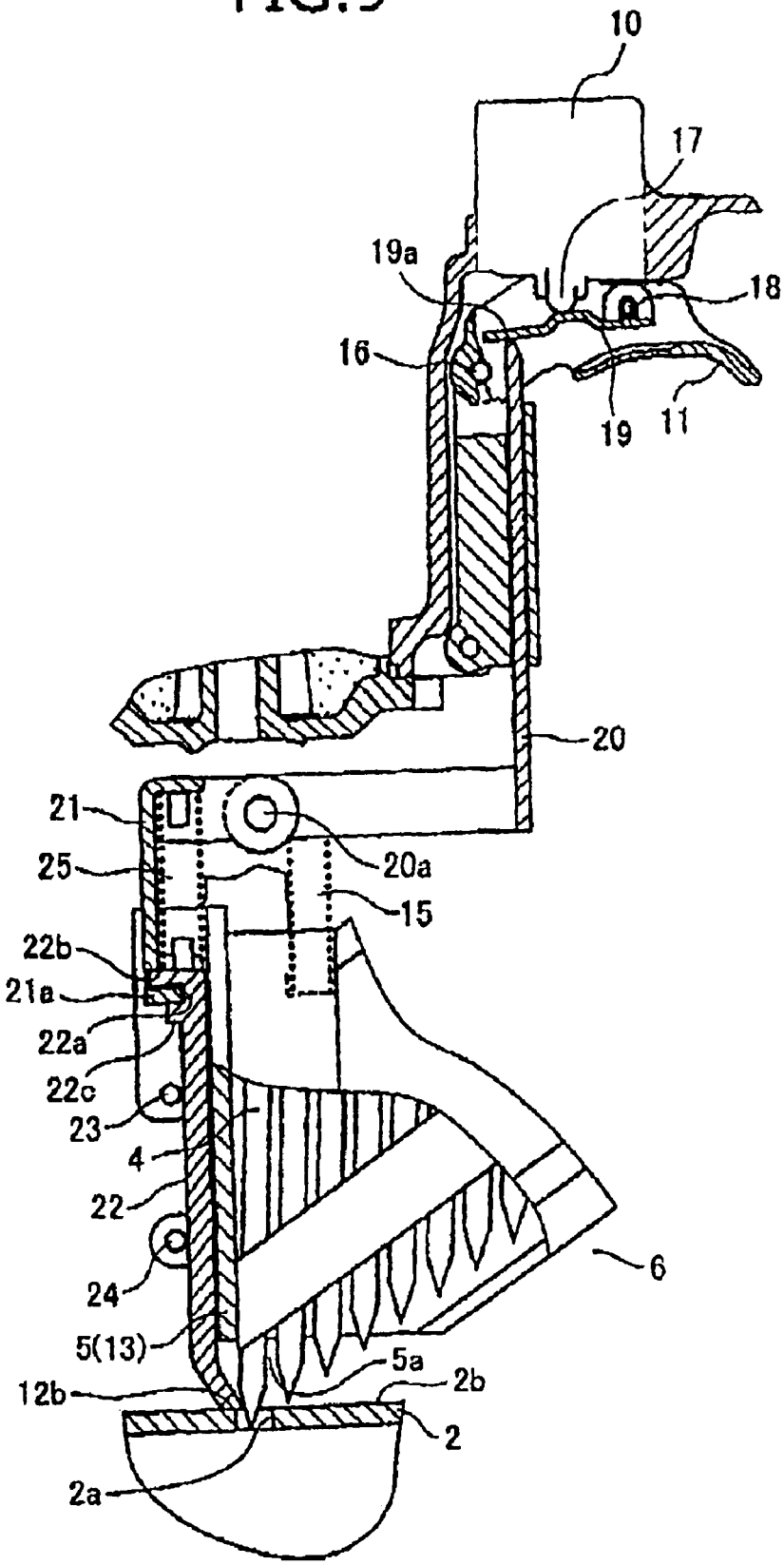
FIG. 9 is a cross-sectional view showing the trigger of the nail gun pulled while the nail gun is pressed against a work piece.

The cam member 21 is pivotably supported on a shaft 20a provided to a lower portion of the upper safety portion 20. As shown in FIGS. 4 to 8, the cam portion 21 includes a lower end 21a and two guide protrusions 21b. As shown in FIG. 3, the lower end 21a fits in the engagement recess portion 22a of the lower safety portion 22. As shown in FIG. 4, the guide protrusions 21b are provided symmetrically on either side of the cam portion 21. As shown in FIGS. 1 and 12, the guide protrusions 21b fit in guide grooves 5b provided in the side surfaces of the nail ejection portion 5. The guide grooves 5b are formed in a diagonally extending shape, so that when the guide protrusions 21b move downward in the guide grooves 5b, the cam member 21 separates from the engagement recess portion 22a as shown in FIG. 11.

Next, an explanation will be provided for operation of the nail gun 1. In this example, the nail gun 1 is used to fix in place a connection clasp 2 shown in FIG. 9. The connection clasp 3 is preformed with a hole 2a. First, the nail tip 4c protruding from the nail ejection hole 5a is set directly into the hole 2a of the connection clasp 2. Because the nail tip 4c protrudes from the nail ejection hole 5a, the nail tip 4c can be easily aligned with the clasp hole 2a. Once the nail tip 4c is set, the lower end 12b of the lower safety portion 22 presses against an upper surface 2b of the clasp 2, so the safety portion 12 is prevented from moving downward.

Figure 10:
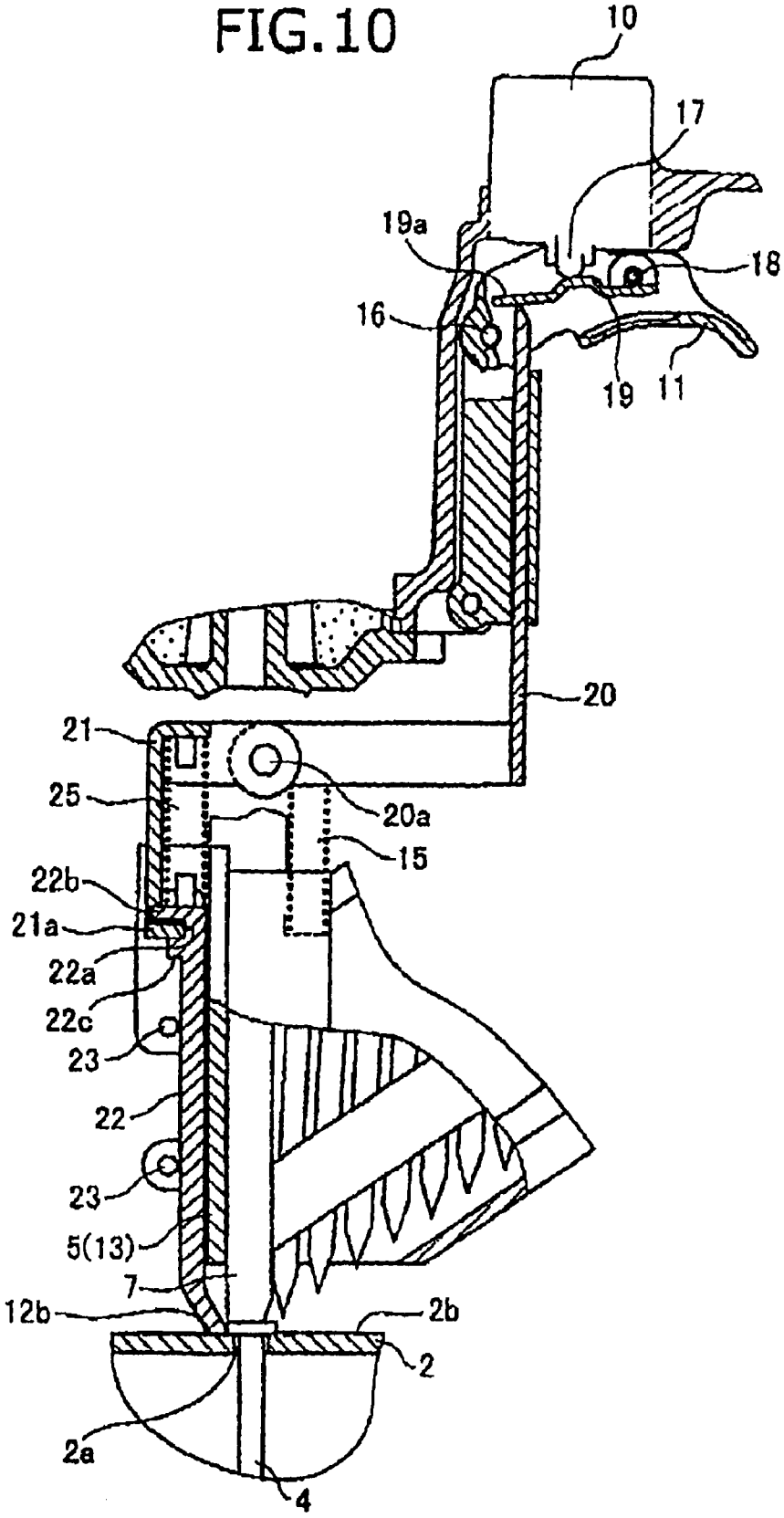
FIG. 10 is a cross-sectional view showing a nail driving operation.

Next, the user pulls the trigger 11 of the nail gun 1. When the user pulls the trigger 11, the trigger 11 pivots centered on the pivot shaft 16 toward the activation switch 10, that is, from the orientation shown in FIG. 1 to the orientation shown in FIG. 9. The support portion 18 of the trigger arm 19 moves upward so that the central portion of the trigger arm 19 abuts against the tip of the plunger 17 of the activation switch 10. As a result, the plunger 17 serves as a fulcrum so that force from the support portion 18 presses the other end 19a of the trigger arm 19 down against the upper end 12a of the safety portion 12. However, the upper end 12a remains in place because the upper surface 2b of the clasp 2 prevents the safety portion 12 from moving. Therefore, the upper end 12a serves as a fulcrum so that force from the support portion 18 presses the central portion of the trigger arm 19 upward against the plunger 17 when the trigger 11 is pulled. When the plunger 17 is pressed in, the activation switch 10 is turned ON, thereby starting operation of the nail gun 1 so that the nail 4 in the nail ejection portion 5 is driven downward as shown in FIG. 10.

The above explanation is for the situation wherein the trigger 11 is pulled after the nail tip 4c protruding from the nail ejection hole 5a was set in the clasp hole 2a. Next, with reference to FIGS. 11 to 13, an explanation will be provided for operations performed when the nail tip 4c is not set in the clasp hole 2a, that is, when the nail ejection port is not located in abutment with a work piece.

In the same manner as described above, when the trigger 11 is pulled in this case, the support portion 18 of the trigger arm 19 moves so that the central portion of the trigger arm 19 abuts against the tip of the plunger 17. Accordingly, the tip of the plunger 17 functions as a fulcrum so that force from the support portion 18 presses the other tip 19a of the trigger arm 19 down against the upper end 12a. However, because there is no work piece to prevent downward movement of the safety portion 12 in this case, the safety portion 12 moves from its upper dead center to its lower dead center against the urging force of the spring 15. The plunger 17 remains positioned at its lower dead center so the activation switch 10 does not turn ON.

As the safety portion 12 moves from its upper dead center to its lower dead center, the cam member 21 moves downward with the upper safety portion 20. As shown in FIG. 12, the two guide protrusions 21b provided on the side surface of the cam member 21 are fitted in the guide grooves 5b provided on the outer side of the nail ejection portion 5. Therefore, the cam member 21 follows the slanted shape of the guide grooves 5b in association with downward movement of the guide protrusions 21b in the guide grooves 5b and pivots on the pivot shaft 20a. As shown in FIG. 11, when the safety portion 12 moves downward to near its lower dead center, the cam member 21 separates from the lower safety portion 22. Described in more detail, the lower end 21a of the cam member 21 pulls away from the lower plate 22c of the engagement recess portion 22a, but remains in contact with the upper plate 22b. The downward urging force of the spring 25 urges the upper plate 22b into abutment with the lower end 21a of the cam member 21. At this time, the lower end 12b protrudes beyond the nail tip 4c. In this situation, if the lower end 12b is pressed against a work piece, or for some other reason the lower safety portion 22 is raised upward from its lower dead center, then all that will happen is that as shown in FIG. 13 the lower safety portion 22 will move upward against the urging force of the spring 25. That is, neither the cam member 21 nor the upper safety portion 20 will move upward. Accordingly, activation switch 10 will not be turned ON, because the trigger arm 19 will not be raised upward.

According to the present embodiment, no other components besides the trigger arm 19 are provided within the trigger 11 and supported pivotably on the trigger 11. Moreover, when the safety portion 12 can move into its lower dead center without obstruction, the plunger 17 serves as a fulcrum when the other tip 19a of the trigger arm 19 presses the upper safety portion 12a down toward its lower dead center. With this configuration the safety portion 12 can have a long stroke, that is, the safety portion 12 moves a long distance from its upper dead center into its lower dead center. Therefore, the lower end 12b of the safety portion 12 can be raised up further above the nail tip 4c, thereby making it easier to visually confirm the position of the nail tip 4c so that the nail will be driven into the work piece with greater positional accuracy.

Also, because the trigger arm 19 pivots with the tip of the plunger 17 serving as a fulcrum, the force at which the safety portion 12 can be pressed downward can be increased. As a result, the following effects can be achieved. It will be possible to move the safety portions 20, 22 downward, even if the safety portions 20, 22 become difficult to move downward because dirt and the like cling to the safety portions 20, 22, the cam member 21, or other components. This enhances reliability of the nail gun. Also, the safety portions 20, 22 can be reliably lowered, even if the load on the spring 15, which is for supporting the safety portions 20, 22 in the upper dead center, is increased because the weight of the safety portions 20, 22 is increased for some reason, for example to increase the strength of, or to lengthen, the safety portions 20, 22.

Figure 15:
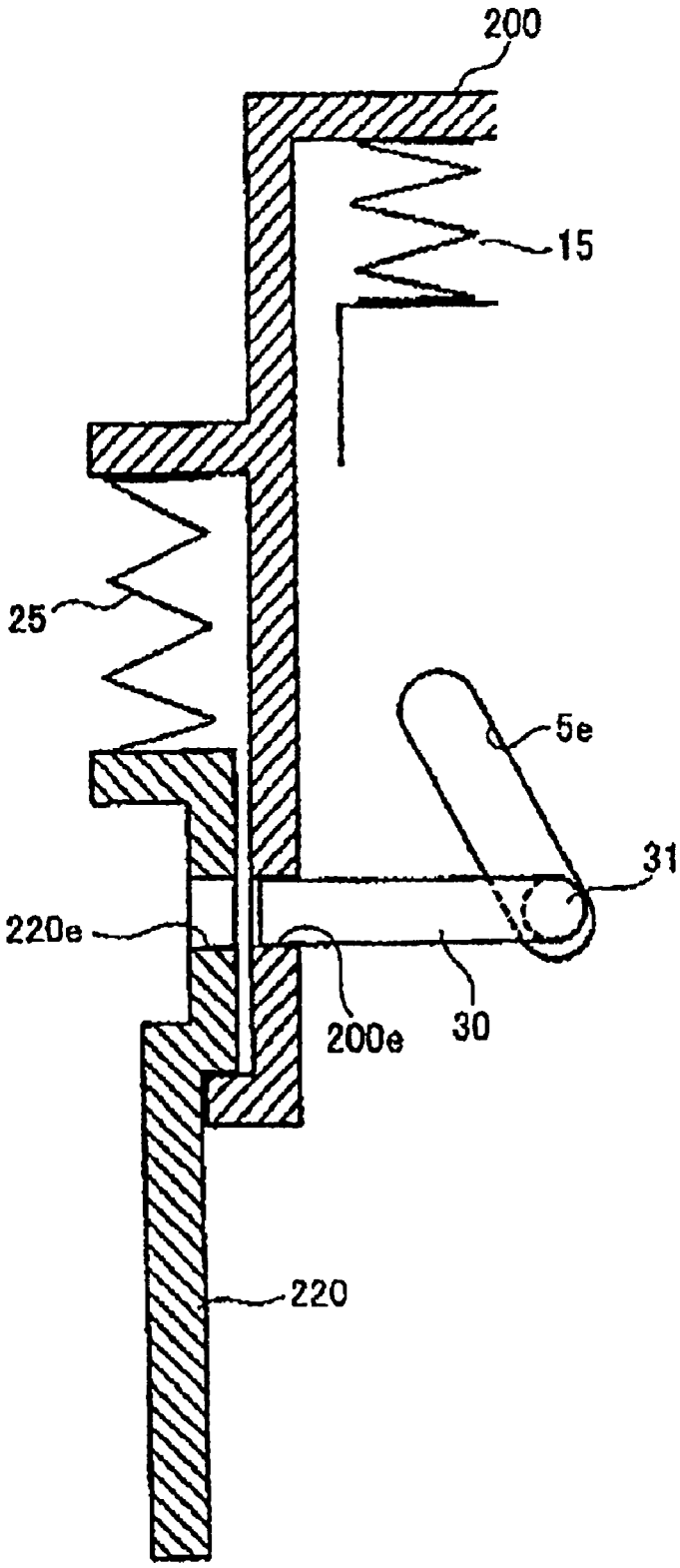
FIG. 15 is a cross-sectional view showing disconnection of upper and lower portions of the safety portion of FIG. 14 when the trigger is pulled while nothing obstructs downward movement of the safety portion.
Figure 16:
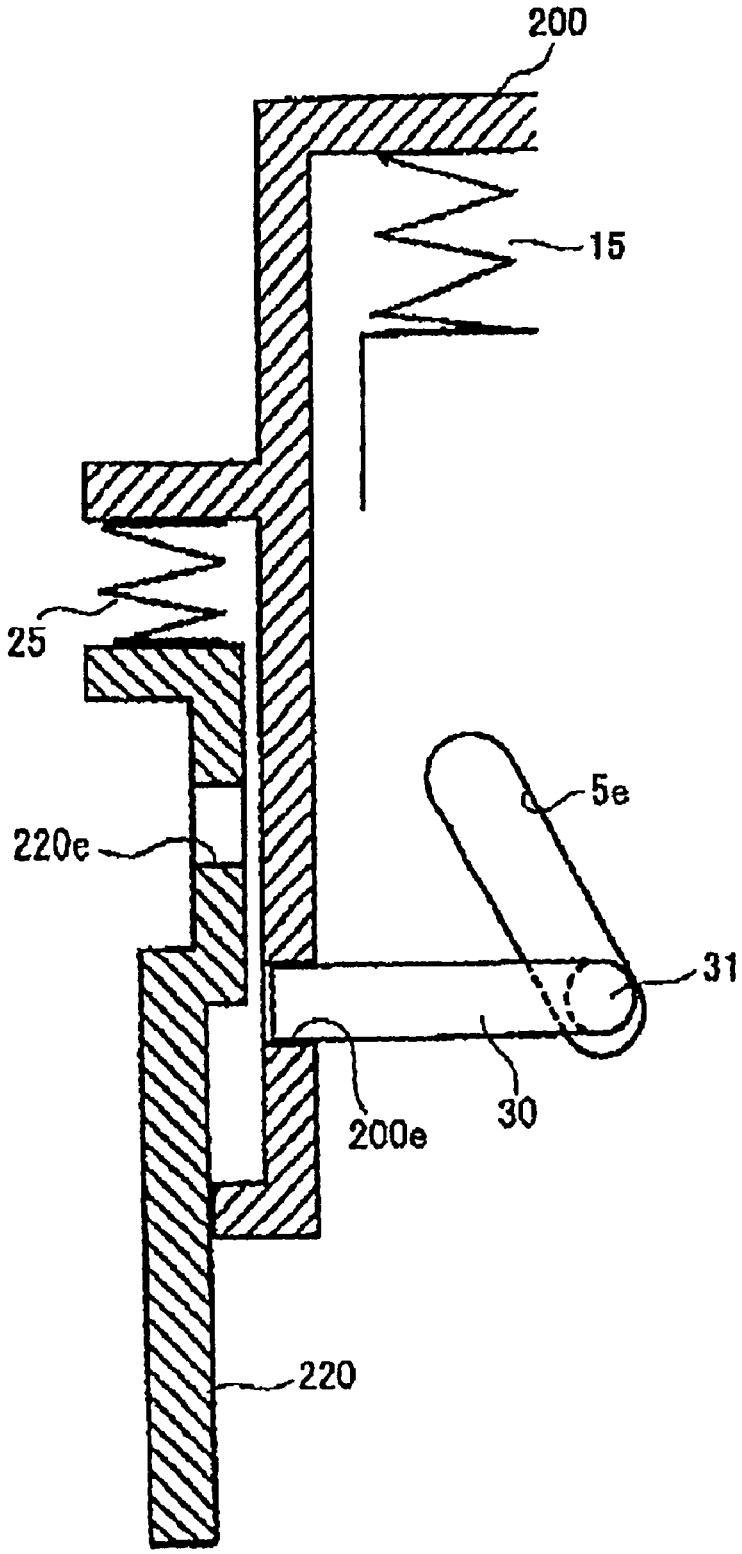
FIG. 16 is a cross-sectional view showing the lower portion of the safety portion of FIG. 14 moving independently upward when pressed against a work piece while upper and lower portions are disconnected as shown in FIG. 15.

Next, a second embodiment will be explained while referring to FIGS. 14 to 16. According in the second embodiment, a safety portion 120 includes an upper safety portion 200, a lower safety portion 220, and a connector 30. The upper safety portion 200 and the lower safety portion 220 are formed with holes 200e and 220e, respectively. The connector 30 is slidably engaged in the holes 200e, 220e, thereby connecting the safety portions 200, 220 together. The connector 30 includes pins 31 on its inside tip. Downward slanting grooves 5e are formed in the inner surfaces of the nail ejection portion 5. The pins 31 are fitted in the grooves 5e.

Figure 14:
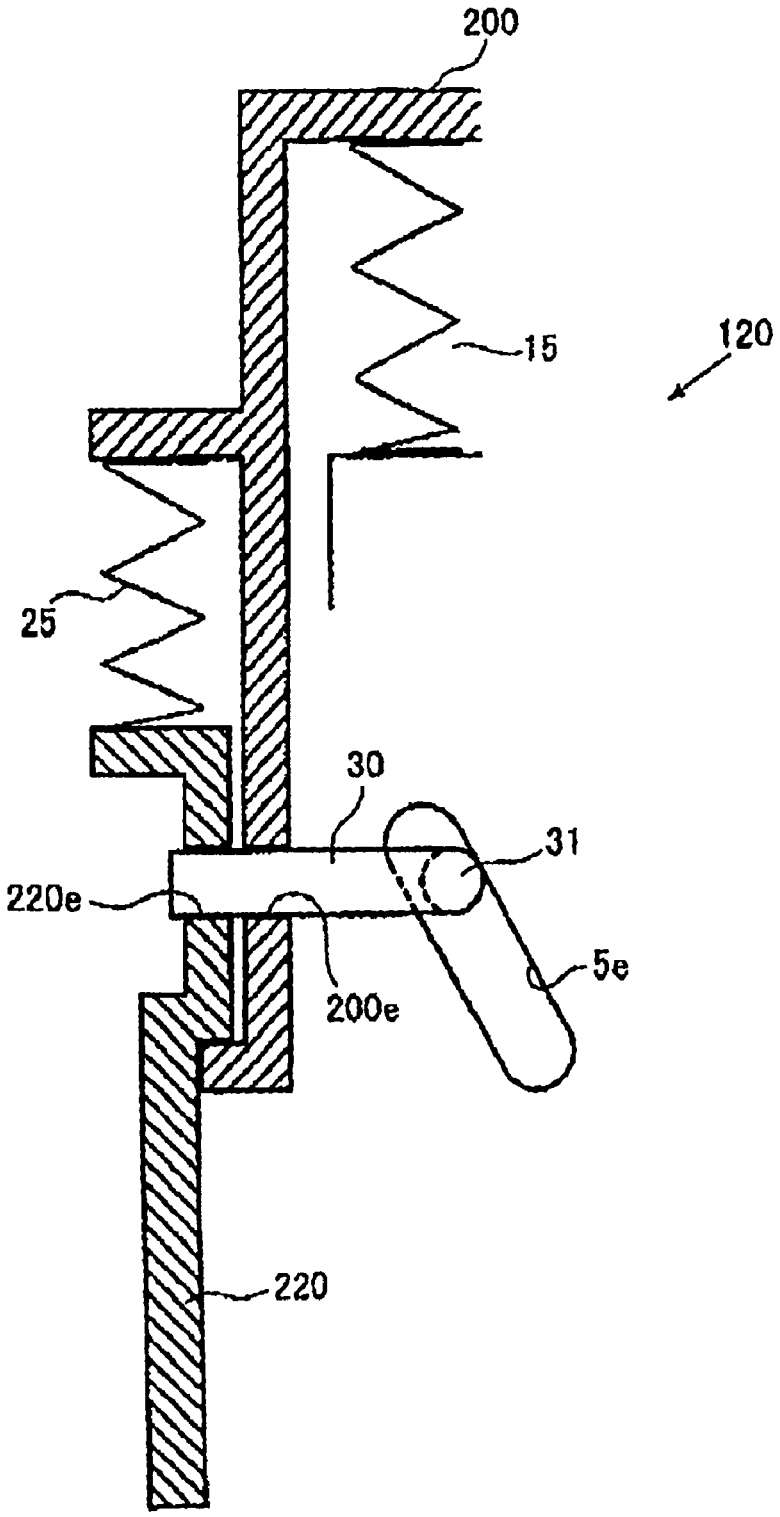
FIG. 14 is a cross-sectional view showing a safety portion according to a second embodiment of the present invention.

When the safety portion 120 is in its upper dead center as shown in FIG. 14, the safety portions 200, 220 are connected together by the connector 30, and so move vertically in an integral manner. However, when the lower safety portion 220 moves downward without obstruction, the pin 31 slides inward following the guide groove 5e. Once the safety portions 200, 220 move downward by a predetermined amount or more, then as shown in FIG. 15 the connector 30 pulls out of the hole 220e of the lower safety portion 220. As a result, there is no danger that the nail gun will fire. Also, even if after this the lower safety portion 220 is raised upward for some reason, then as shown in FIG. 16 the lower safety portion 220 alone will merely move vertically. Again, there is no danger that the nail gun will fire.

What is claim is:

1. A nail gun for driving a nail into a work piece, the nail gun comprising:

a body;

a nail ejection member connected to said body;

a blade supported in said body capable of movement in opposing first and second directions and, when activated, driven in said second direction to strike a nail in said nail ejection member;

an activation switch for activating said blade when a predetermined portion of the switch is pressed;

a trigger member supported pivotably on said body; and a safety mechanism having a first member disposed in contact with a free end portion of said trigger member and a second member positioned near said nail ejection member and connecting member between said first and second members, said safety mechanism being supported capable of movement in said first and second directions between a first position and a second position, wherein when the trigger member is pivoted, pivoting movement of said trigger member moves to press said predetermined portion of said switching mechanism and to press the free end portion of said trigger member in the second direction against said first member of said safety mechanism.

2. A nail gun as claimed in claim 1, wherein when movement of said safety mechanism is unobstructed, said safety mechanism moves freely in the second direction from the first position to the second position.

3. A nail gun as claimed in claim 1, wherein when movement of said safety mechanism is obstructed trigger member presses the predetermined portion of said activation switch so that said activation switch activates the blade.

4. A nail gun for driving a nail into a work piece, the nail gun comprising:

a body;

a nail ejection member connected to said body;

a blade supported in said body capable of movement in opposing first and second directions and, when activated, driven in said second direction to strike a nail in said nail ejection member;

an activation switch for activating said blade when a predetermined portion of the switch is pressed;

a trigger member supported pivotably on said body; and a safety mechanism having a first member disposed in contact with a free end portion of said trigger member, a second member positioned near said nail ejection member and connecting member between said first and second members, said safety mechanism including separation mechanism to separate connection between said first and second members of said safety mechanism when said free end portion of said trigger member moves said first member in the second direction by a predetermined amount or greater, said safety mechanism being supported capable of movement in said first and second directions between a first position and a second position, wherein when movement of said safety mechanism is unobstructed, said safety mechanism moves freely in the second direction from the first position to the second position, and wherein when movement of said safety mechanism is obstructed said trigger member presses the predetermined portion of said switch so that said activation switch activates the blade.

5. A nail gun as claimed in claim 4, wherein said separation mechanism includes a cam member pivotably supported at said connecting member of said safety mechanism to engage with a recess portion formed with said second member of said safety mechanism, and wherein when movement of said safety mechanism is obstructed, pressing force of said trigger member free end acts to release the engagement of said cam with said recess.

6. A nail gun for driving a nail into a work piece, the nail gun comprising:

a body;

a nail ejection member connected to said body;

a blade supported in said body capable of movement in opposing first and second directions and, when activated, driven in said second direction to strike a nail in said nail ejection member;

an activation switch for activating said blade when a predetermined portion of said switch is pressed;

a trigger member supported pivotably on said body; and a safety mechanism having a first member disposed in contact with a free end of said trigger member, a second member positioned near said nail ejection member and connecting member between said first and second members, said first and second members of said safety mechanism being supported in parallel with said nail pushing mechanism to move in said first and second directions, said safety mechanism being supported capable of movement in said first and second directions between a first position and a second position, wherein when movement of said safety mechanism is unobstructed, said safety mechanism moves freely in the second direction from the first position to the second position, and wherein when movement of said safety mechanism is obstructed trigger member presses the predetermined portion of said activation switch so that said activation switch activates the blade.

7. A nail gun for driving a nail into a work piece, the nail gun comprising:

a body;

a nail ejection member connected to said body;

a blade supported in said body capable of movement in opposing first and second directions and, when activated, driven in said second direction to strike a nail in said nail ejection member;

an activation switch for activating said blade when a predetermined portion of the switch is pressed;

a trigger member supported pivotably on said body;

a safety mechanism having a first member disposed in contact with a free end of the trigger member, a second member positioned near said nail ejection member and connecting member between said first and second members, said first and second members of said safety mechanism being supported in parallel with said blade to move in said first and second directions, said safety mechanism being supported capable of movement in said first and second directions between a first position and a second position; and an elastic member for positioning said safety mechanism into said first position, and wherein when the trigger is pivoted, pivoting movement of said trigger moves said trigger member moves to press the predetermined portion of said switch and to press the free end portion of said trigger member in the second direction against said first member of said safety mechanism.

8. A nail gun for driving a nail into a work piece, the nail gun comprising:

a body;

a nail ejection member connected to said body;

a blade supported in said body capable of movement in opposing first and second directions and, when activated, driven in said second direction to strike a nail in said nail ejection member;

an activation switch for activating said blade when a predetermined portion of the switch is pressed;

a trigger member supported pivotably on said body; and a safety mechanism having a first member disposed in contact with a free end portion of the trigger member, a second member positioned near said nail ejection member and connecting member between said first and second members, said safety mechanism including separation mechanism to separate connection between said first and second members of said safety mechanism when said free end portion of said trigger member moves said first member in the second direction by a predetermined amount or greater, said safety mechanism being supported capable of movement in said first and second directions between a first position and a second position, said first and second members of said safety mechanism being supported in parallel with said nail pushing mechanism to move in said first and second directions, and wherein when the trigger is pivoted, pivoting movement of said trigger moves to press the predetermined portion of the switch and to press the free end portion of said trigger member in the second direction against said first member of said safety mechanism.

9. A nail gun for driving a nail into a work piece, the nail gun comprising:

a body;

a nail ejection member connected to said body;

a blade supported in said body capable of movement in opposing first and second directions and, when activated, driven in said second direction to strike a nail in said nail ejection member;

an activation switch for activating said blade when a predetermined portion of the switch is pressed;

a trigger member supported pivotably on said body;

a safety mechanism having a first member disposed in contact with a free end portion of said trigger member, a second member positioned near said nail ejection member and connecting member between said first and second members, said safety mechanism including separation mechanism to separate connection between said first and second members of said safety mechanism when said free end portion of said trigger member moves said first member in the second direction by a predetermined amount or greater, said safety mechanism being supported capable of movement in said first and second directions between a first position and a second position, said first and second members of said safety mechanism being supported in parallel with said nail pushing mechanism to move in said first and second directions; and an elastic member for positioning said safety mechanism into said first position, wherein when the trigger is pivoted, pivoting movement of said trigger member moves to press the predetermined portion of the switch and to press the free end portion of said trigger member in the second direction against said first member of said safety mechanism, wherein when movement of said safety mechanism is unobstructed, said safety mechanism moves freely in the second direction from the first position to the second position, and wherein when movement of said safety mechanism is obstructed said trigger member presses the predetermined portion of said activation switch so that said activation switch activates the blade.

10. A nail gun for driving a nail into a work piece, the nail gun comprising:

a body;

a nail ejection member connected to said body;

a blade supported in said body capable of movement in opposing first and second directions and, when activated, driven in said second direction to strike a nail in said nail ejection member;

an activation switch for activating said blade when a predetermined portion of said switch is pressed;

a trigger member supported pivotably on said body;

a safety mechanism having a first member disposed in contact with said trigger member, a second member positioned near said nail ejection member and connecting member between said first and second members, said first and second members of said safety mechanism being supported in parallel with said blade to move in said first and second directions, wherein when the trigger is pivoted, pivoting movement of said trigger member moves to press the predetermined portion of said switch and to press a free end of the trigger member in the second direction against said first member of said safety mechanism.

11. A nail gun as claimed in claim 10, wherein when movement of said safety mechanism is unobstructed, said safety mechanism moves freely in the second direction from the first position to the second position.

12. A nail gun as claimed in claim 10, wherein when movement of said safety mechanism is obstructed said trigger member presses the predetermined portion of said activation switch so that said activation switch activates the blade.

13. A nail gun as claimed in claim 10, which further comprises a separation mechanism to separate connection between said first and second members of said safety mechanism when said trigger member moves said first member in the second direction by a predetermined amount or greater.

14. A nail gun for driving a nail into a work piece, the nail gun comprising:

a body;

a nosepiece through which nails are ejected, the nosepiece being provided on a lower end of the body;

a magazine *housing a plurality of connected nails and* that disposes *said connected* nails one at a time to the nosepiece;

a striking mechanism that strikes a nail disposed in the nosepiece, the striking mechanism being provided in the body at a position above the nosepiece;

a trigger switch that activates the striking mechanism, the trigger switch being provided in the body, a push portion with an end that is movable following the nosepiece and that is normally positioned in an upper dead center, wherein operation of the trigger switch is enabled when the end of the push portion is prevented from moving downward, at least a tip of the nail disposed in the nosepiece protruding from a tip of the nosepiece and protruding farther in a tip-side direction than the push portion so that the nail tip can be easily aligned with a desired position.

*15. A nail gun according to claim 14, wherein said connected nails are arranged on a single plane.*

*16. A nail gun according to claim 14, wherein*

*the tips of the connected nails are arranged in a single line.*

*17. A nail gun according to claim 14, wherein*

*said magazine further includes a feeder which feeds said connected nails by pressure from a feeder spring.*

*18. A nail gun for driving a nail into a work piece, the nail gun comprising:*

*a body;*

*a nosepiece through which nails are ejected, the nosepiece being provided on a lower end of the body;*

*a magazine housing a plurality of connected nails and that disposes said connected nails one at a time to the nosepiece;*

*a striking mechanism that strikes a lead nail of the connected nails disposed in the nosepiece, the striking mechanism being provided in the body at a position above the nosepiece;*

*a trigger switch that activates the striking mechanism, the trigger switch being provided in the body,*

*a push portion with an end that is movable following the nosepiece and that is normally positioned in an upper dead center, wherein*

*operation of the trigger switch is enabled when the end of the push portion is prevented from moving downward,*

*when the lead nail reaches the nosepiece, at least a tip of the lead nail protruding from a tip of the nosepiece and protruding farther in a tip-side direction than the push portion so that the nail tip can be easily aligned with a desired position.*

*19. A nail gun for driving a nail into a work piece, the nail gun comprising:*

*a body;*

*a nosepiece through which nails are ejected, the nosepiece being provided on a lower end of the body;*

*a magazine housing a plurality of connected nails and that disposes said connected nails one at a time to the nosepiece;*

*a striking mechanism that strikes a nail disposed in the nosepiece, the striking mechanism being provided in the body at a position above the nosepiece;*

*a trigger switch that activates the striking mechanism, the trigger switch being provided in the body,*

*a push portion with an end that is movable following the nosepiece and that is normally positioned in an upper dead center, wherein*

*operation of the trigger switch is enabled when the end of the push portion is prevented from moving downward,*

*at least a tip of the nail disposed in the nosepiece protruding from a tip of the nosepiece and protruding farther in a tip-side direction than the push portion so that the nail tip can be easily aligned with a desired position, and*

*said magazine is disposed at the position of said tip of the nosepiece.*

*20. A nail gun for driving a nail into a work piece, the nail gun comprising:*

*a body;*

*a nosepiece through which nails are ejected, the nosepiece being provided on a lower end of the body;*

*a magazine housing a plurality of connected nails and that disposes said connected nails one at a time to the nosepiece;*

*a striking mechanism that strikes a nail disposed in the nosepiece, the striking mechanism being provided in the body at a position above the nosepiece;*

*a trigger switch that activates the striking mechanism, the trigger switch being provided in the body,*

*a push portion with an end that is movable following the nosepiece and that is normally positioned in an upper dead center;*

*a trigger pivotable in the upward direction;*

*a first safety member that moves downward in response to the trigger arm pivoting in the upward direction;*

*a second safety member disposed in parallel with the first member, extending toward the work piece, and including a push portion with an end that is movable following the nosepiece and that is normally positioned in an upper dead center; and*

*a third safety member which is disposed between and communicates with the first member and the second member, wherein*

*operation of the trigger switch is enabled when the end of the push portion is prevented from moving downward,*

*at least a tip of the nail disposed in the nosepiece protruding from a tip of the nosepiece and protruding farther in a tip-side direction than the push portion so that the nail tip can be easily aligned with a desired position,*

*activation of the striking mechanism is enabled when the end of the push portion is obstructed from moving downward upon pivoting the trigger in the upward direction,*

*when downward movement of the push portion is unobstructed, pivoting the trigger in the upward direction will not activate the striking mechanism.*

*21. A nail gun according to claim 20, wherein*

*when the trigger is pivoted in the upward direction and the second member has moved downward without obstruction, force applied to the second member in the upward direction will not move the first member upward.*

*22. A nail gun as claimed in claim 21, wherein*

*the third member is pivotably supported by a shaft.*

* * * * *